UNITED STATES PATENT OFFICE.

CHARLES WANZER, OF NEW YORK, N. Y.

IMPROVED CEMENT FOR SLATE-ROOFING.

Specification forming part of Letters Patent No. 35,720, dated June 24, 1862; Reissue No. 2,215, dated March 27, 1866.

*To all whom it may concern:*

Be it known that I, CHARLES WANZER, of the city, county, and State of New York, have invented a new and Improved Cement for Slate-Roofing; and I do hereby declare that the following is a full, clear, and exact description thereof, which will enable others skilled in the art to make and use the same.

This cement is especially designed for slate-roofing of that class in which slabs are laid without a lap, the ends simply abutting against each other as well as the sides.

The object of the invention is to obtain a cement which will be impervious to water, insoluble, and at the same time not harden by age, so as to be liable to crack and shell off from the surface to which it is applied. To this end I use a compound of grease-pitch one part, quicklime two parts, Venetian red or ocher two parts, linseed or other oil one-half part. Instead of quicklime, chloride of lime or bleaching-powder may be used, two parts of the latter being equal to three of the former. Hydrate of lime and slaked lime may also be used, the proportion of the latter being equal to what the two parts of quicklime above given would make when slaked. These substances are simply mixed together, the thorough incorporation of the parts being expedited by a gentle heat. The "grease-pitch" (commonly so called) is the refuse of distilled grease or other oleaginous substance, and is of a rather tenacious or sticky nature, and when combined with the carbonate or the chloride of lime, Venetian red or other ocher, and the oil forms a cement which will not harden by age, so as to crack and peel or shell off, although the two last ingredients may be dispensed with, if so desired. The oil reduces the body of the other substances and renders the cement sufficiently soft or plastic to be readily applied to the surface designed to receive it. The Venetian red or ocher gives a proper consistency to the cement by reducing the greasy nature of the pitch, while the lime or the chloride of lime or bleaching-powder has an alkaline tendency, and saponifies to a certain extent, if not wholly, the oil and grease in the pitch.

This cement is insoluble and impervious to water, and effectually retains the slate slabs in proper position. After being compounded or freshly made, it may be "worked"—that is to say, applied to the surface or foundation of the roof—with great facility, and the slabs embedded in it without any trouble whatever. It hardens to a certain degree with age, but to a certain extent only, and without leaving any fissures or cracks.

I would remark that I prefer linseed-oil to other kinds; but fish-oil will answer passably well. Any of the ochers—yellow ocher, for instance—would answer instead of Venetian red.

I would remark that I prefer using the quicklime, although I have employed the chloride of lime or bleaching-powder with success. The latter is more expensive, and the quicklime seems to answer equally as good a purpose. Slaked lime also answers equally as well as the quicklime.

Having thus described my invention, what I claim as new, and desire to secure by Letters Patent, is—

A compound to be used as a cement, composed of grease-pitch or tar and quicklime, hydrate of lime, chloride of lime, or bleaching-powder or any equivalent thereof, either with or without linseed or other oil and Venetian red or other ocher, substantially as described.

CHARLES WANZER.

Witnesses:

ALBERT W. BROWN,
M. M. LIVINGSTON.